US006636405B2

United States Patent
Lowenstein

(10) Patent No.: US 6,636,405 B2
(45) Date of Patent: Oct. 21, 2003

(54) MITIGATION OF 3RD HARMONIC CURRENTS IN ELECTRICAL POWER DISTRIBUTION SYSTEMS

(76) Inventor: Michael Z. Lowenstein, 941 Prince Ct., Fruita, CO (US) 81521

(*) Notice: Subject to any disclaimer, the term of this patent is extended or adjusted under 35 U.S.C. 154(b) by 0 days.

(21) Appl. No.: 09/977,640

(22) Filed: Oct. 11, 2001

(65) Prior Publication Data

US 2002/0114118 A1 Aug. 22, 2002

Related U.S. Application Data

(63) Continuation-in-part of application No. 08/422,360, filed on Apr. 17, 1995, which is a continuation-in-part of application No. 08/130,088, filed on Sep. 30, 1993, now abandoned.

(51) Int. Cl.$^7$ ............................ H02H 1/00; H01F 30/12
(52) U.S. Cl. ........................ 361/113; 307/105; 333/176
(58) Field of Search .................... 361/110, 111, 361/113, 42; 307/105; 333/175, 176

(56) References Cited

U.S. PATENT DOCUMENTS

| | | | |
|---|---|---|---|
| 1,955,788 A | * | 4/1934 | Bode |
| 2,246,926 A | * | 6/1941 | Roman |
| 3,813,593 A | * | 5/1974 | Tice et al. ............ 322/58 |
| 3,849,677 A | | 11/1974 | Stacey et al. |
| 3,859,542 A | | 1/1975 | Kennedy |
| 3,881,137 A | | 4/1975 | Thanawala |
| RE29,080 E | | 12/1976 | Kiko |
| 4,176,310 A | | 11/1979 | Elenga et al. |
| 4,271,446 A | * | 6/1981 | Comstock ............ 340/638 |
| 4,819,125 A | | 4/1989 | Arinobu et al. |
| 4,833,344 A | | 5/1989 | Moon et al. |
| 4,922,364 A | | 5/1990 | Paulsson |
| 4,939,486 A | * | 7/1990 | Bergdahl et al. |
| 4,961,044 A | | 10/1990 | Kravitz |
| 5,663,636 A | * | 9/1997 | Falldin et al. ............ 323/356 |
| 5,880,719 A | | 3/1999 | Kikinis |

* cited by examiner

*Primary Examiner*—Kim Huynh
(74) *Attorney, Agent, or Firm*—Irving M. Weiner; Pamela S. Burt; Weiner & Burt, P.C.

(57) ABSTRACT

In a multiple phase system for supplying power from an AC source to nonlinear loads, a device for substantially eliminating currents in a neutral wire. The device includes a completely-passive parallel resonant circuit having three passive electrical branches connected in parallel tuned to a third harmonic frequency of the AC source. The three branches comprise a first branch consisting of a capacitor, a second branch consisting of a reactor, and a third branch consisting of a resistor. The resonant circuit is connected to the neutral wire.

20 Claims, 11 Drawing Sheets

| TEST | VOLTAGE (RMS VOLTS) | CURRENT (RMS AMPS) | WATTS | VOLT-AMPS | POWER FACTOR |
|---|---|---|---|---|---|
| NO BLOCKADE | 116.7 | 4.972 | 360.4 | 580.4 | 0.62 |
| BLOCKADE | 117.2 | 3.173 | 355.9 | 371.8 | 0.96 |

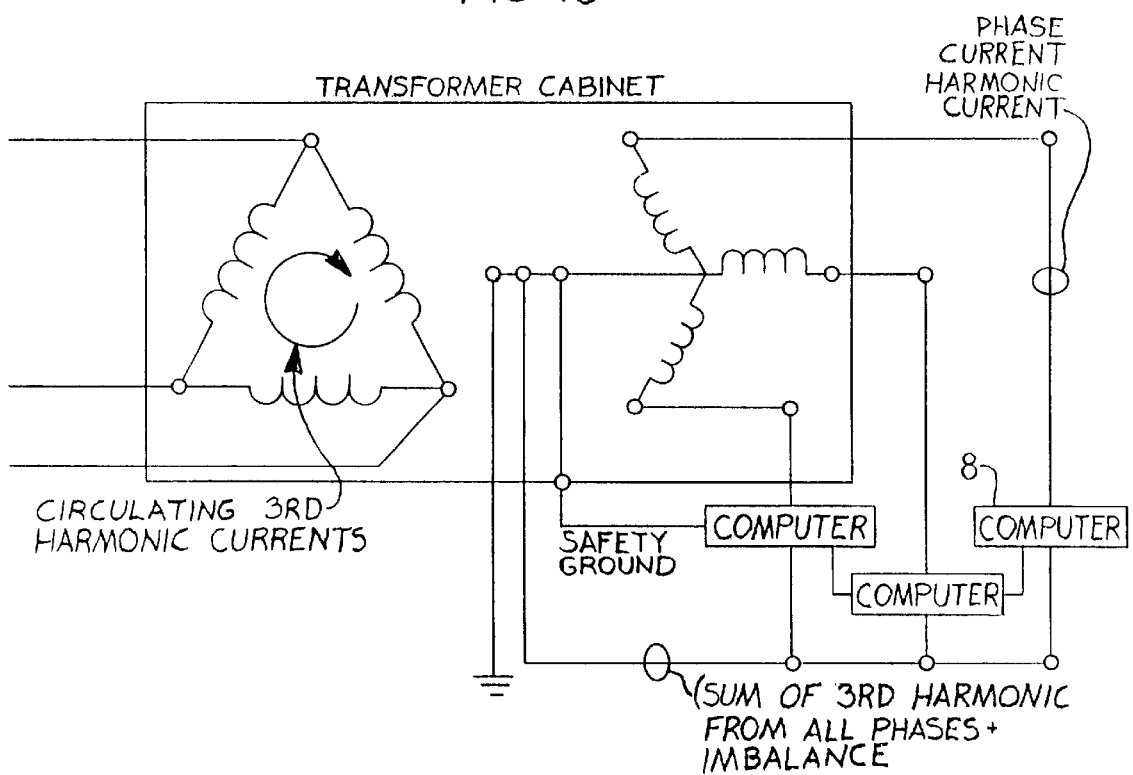

FIG 11
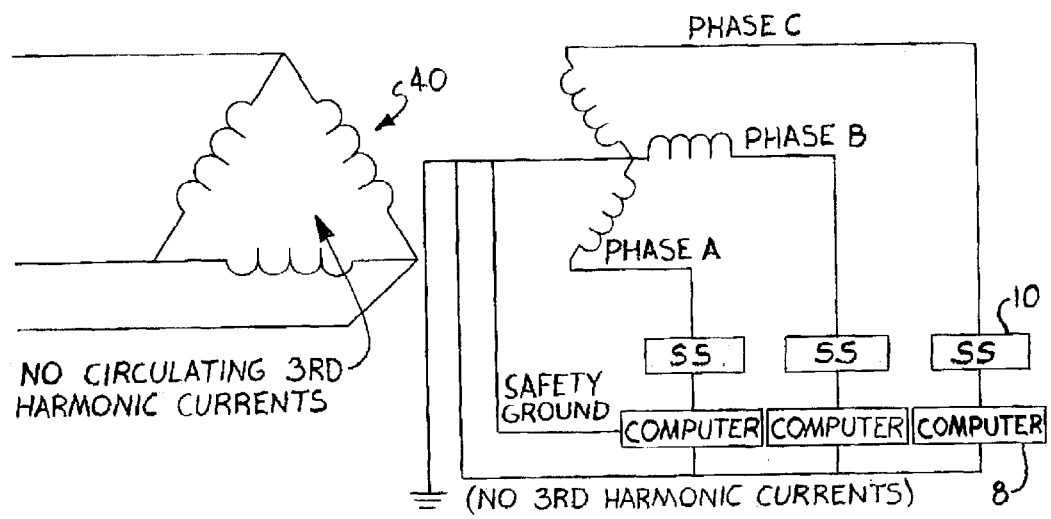
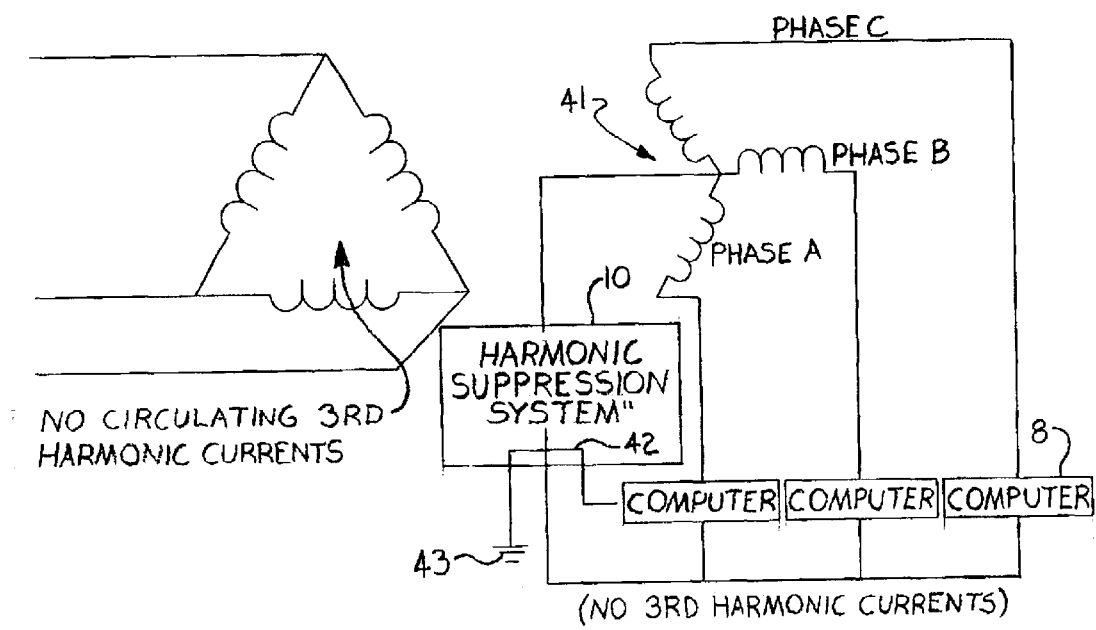
FIG 12

FIG 19
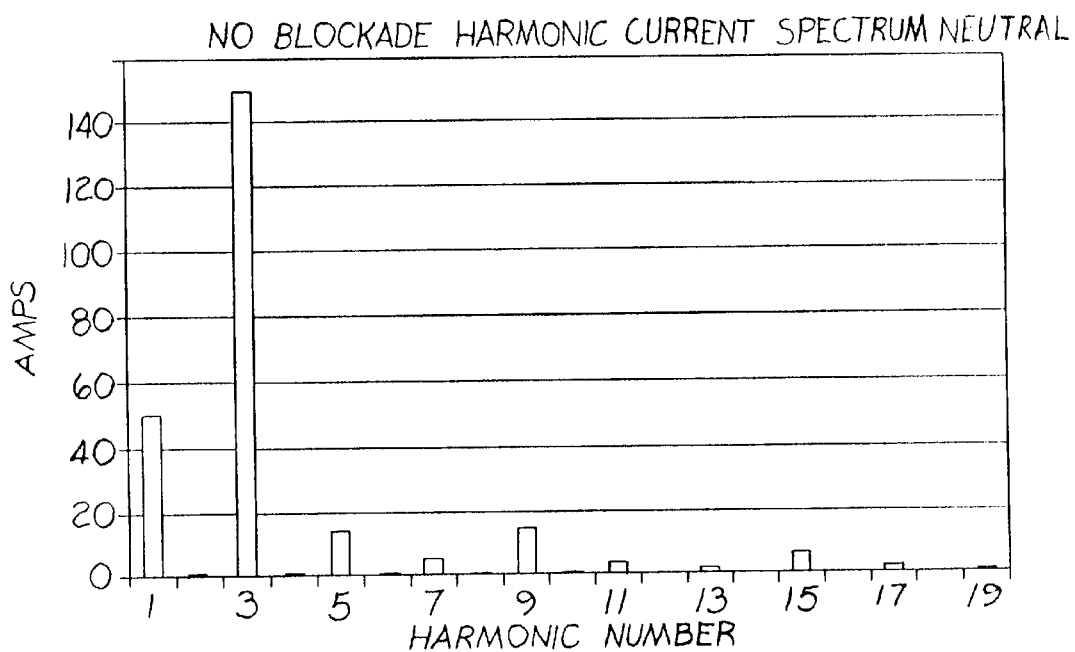
BLOCKADE HARMONIC CURRENT SPECTRUM NEUTRAL
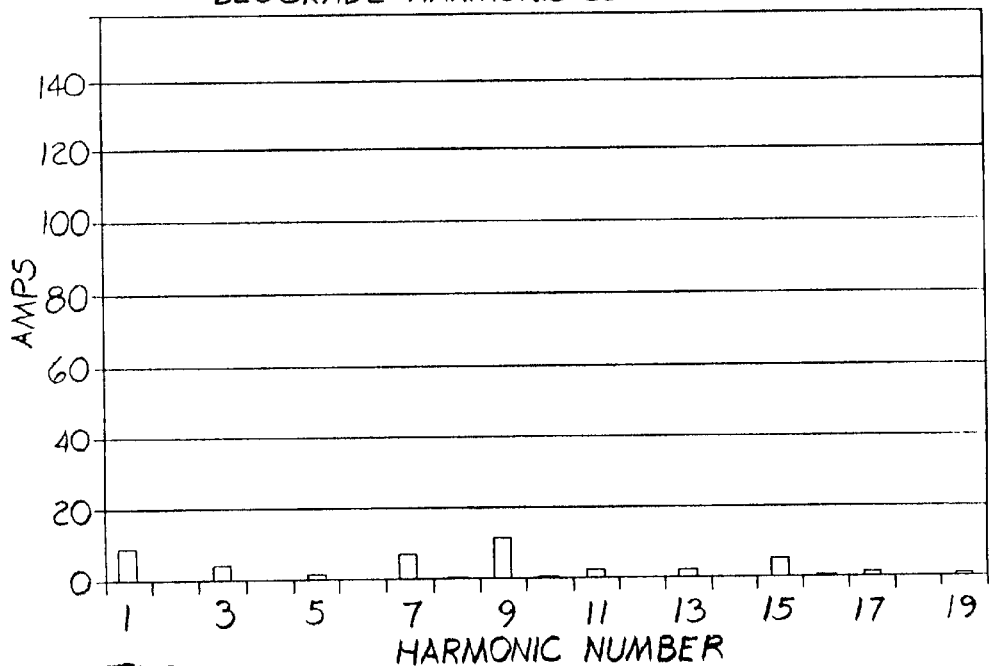
FIG 20

US 6,636,405 B2

MITIGATION OF 3RD HARMONIC CURRENTS IN ELECTRICAL POWER DISTRIBUTION SYSTEMS

This application is a CIP of U.S. Ser. No. 08/422,360 filed Apr. 17, 1995, which in turn is a CIP of U.S. Ser. No. 08/130,088 filed Sep. 30, 1993.

The invention relates to harmonic suppression systems. In particular, the invention relates to mitigating $3^{rd}$ harmonic currents electrical power distribution systems.

BACKGROUND OF THE INVENTION

Harmonics in an electrical distribution system are caused by the types of loads connected to the system. Modern electronic equipment and controls, because they draw current in a non-linear fashion, cause harmonic currents to flow throughout the system. The extra currents may result in overloading or failure of system components.

The prior, but not necessarily relevant, art is exemplified by the following U.S. patents: Stacey et al. U.S. Pat. No. 3,849,677; Kennedy U.S. Pat. No. 3,859,542; Thanawala U.S. Pat. No. 3,881,137; Kiko U.S. Reissue Pat. No. 29,080; Elenga et al. U.S. Pat. No. 4,176,310; Arinobu et al. U.S. Pat. No. 4,819,125; Moon et al. U.S. Pat. No. 4,833,344; Paulsson U.S. Pat. No. 4,922,364; Bergdahl et al. U.S. Pat. No. 4,939,486; Kravitz U.S. Pat. No. 4,961,044; and Gilardi et al. U.S. Pat. No. 5,243,648.

The term "Blockade™ Technology" as used herein means technology which: eliminates the production of harmonics at their source; is completely-passive and therefore cost effective, reliable, and efficient; is easily installed and does not require fuses; can handle any load on the distribution system, and does not require load balancing to be effective; and resists overloading (does not require resizing if more harmonic loads are added).

It is a desideratum of the invention to avoid the animadversions of conventional devices and systems dealing with the aforementioned problem.

SUMMARY OF THE INVENTION

The present invention provides in a multiple phase electrical distribution system for supplying power from an AC source to one or more nonlinear loads connected to at least one phase line therein, a device for substantially eliminating currents in a neutral wire, said device comprising: a completely-passive parallel resonant circuit having three passive electrical branches connected in parallel; said first completely-passive parallel resonant circuit is tuned to a third harmonic frequency of a fundamental frequency of said AC source; said three passive electrical branches comprise a first branch consisting of a capacitor, a second branch consisting of a reactor, and a third branch consisting of a resistor; and said completely-passive parallel resonant circuit being electrically connected to said neutral wire.

The present invention also provides an electrical system for supplying power to one or more nonlinear loads connected to at least one phase line of a multiple phase distribution system, comprising: a delta-wye transformer; a completely-passive parallel resonant circuit having three passive electrical branches connected in parallel; said first completely-passive parallel resonant circuit is tuned to a third harmonic frequency of a fundamental frequency of said AC source; said three passive electrical branches comprise a first branch consisting of a capacitor, a second branch consisting of a reactor, and a third branch consisting of a resistor; and said completely-passive parallel resonant circuit being electrically connected to the neutral wire of the wye-portion of said delta-wye transformer.

FIG. 10 is a schematic showing $3^{rd}$ harmonic current flow in a transformer.

FIG. 11 is a schematic showing harmonic current flow with each computer load plugged into a series harmonic suppression system.

FIG. 12 is schematic showing harmonic current flow with a single series harmonic system in the neutral of a distribution transformer.

FIG. 19 is a graph showing neutral harmonic currents before application of a Blockade™ Technology harmonic suppression system.

FIG. 20 is a graph showing neutral harmonic currents after application of a Blockade™ Technology harmonic suppression system.

DETAILED DESCRIPTION OF THE PREFERRED EMBODIMENTS

Figure 1:
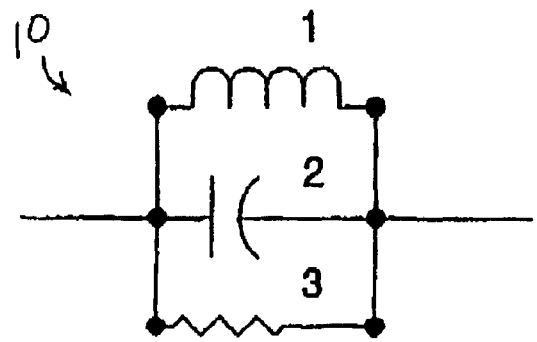
FIG. 1 is a schematic diagram of a Blockade™ Technology harmonic suppression system according to the invention.

FIG. 1 shows a circuit schematic of one embodiment of a harmonic suppression system 10 according to the invention.

The suppression system 10: is completely passive; preferably comprises reactor 1, capacitor 2, and resistor 3 connected in parallel; and is tuned to the third harmonic of the AC power source frequency. The suppression system 10 is preferably, but not necessarily, connected in series with a nonlinear load 8 (FIGS. 2 and 3) and between the load 8 and the AC source 4 along each phase line in the electrical power system.

Figure 4:
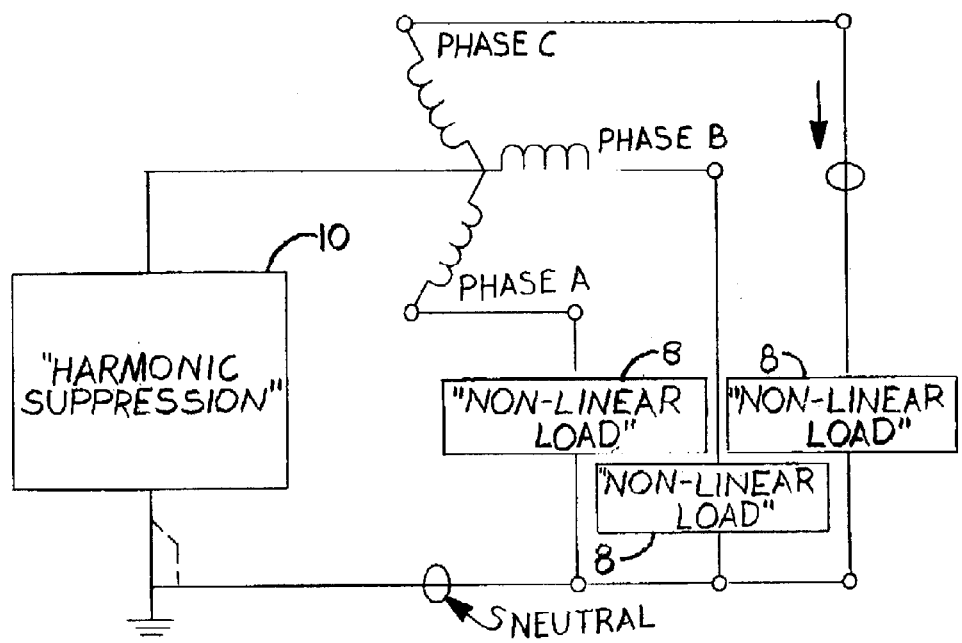
FIG. 4 is a schematic block diagram showing the Blockade™ Technology harmonic suppression system connected to the neutral wire.

FIG. 4 shows an embodiment wherein the harmonic suppression system is connected to the neutral wire of the 3-phase electrical distribution system.

Figure 5:
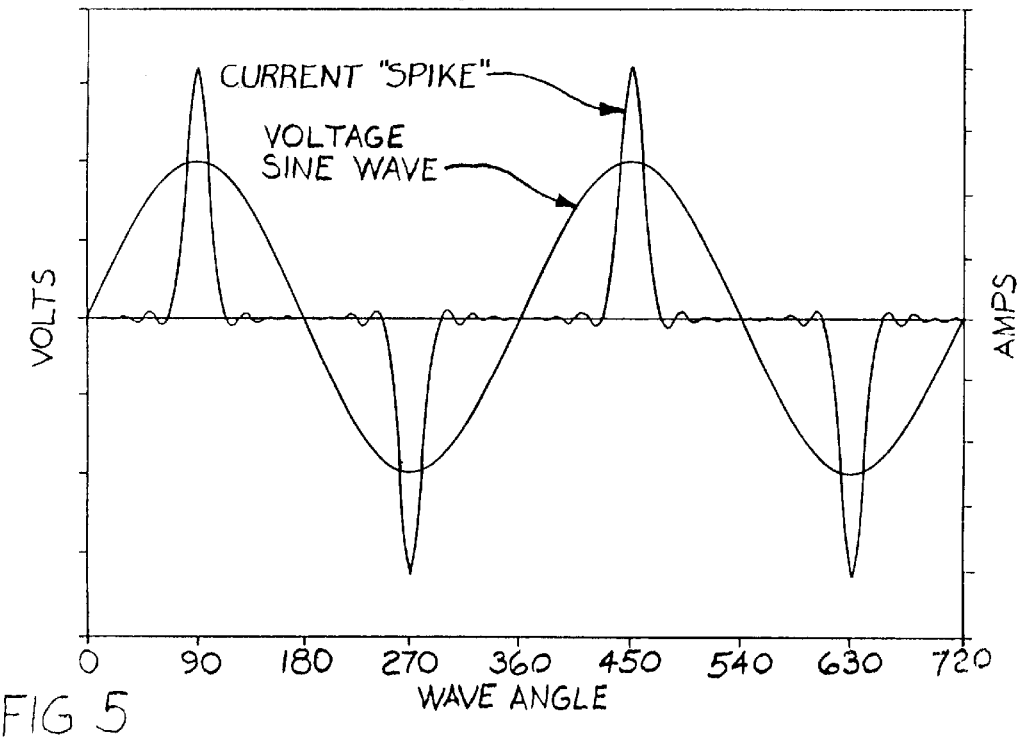
FIG. 5 is a graph showing a typical current drawn by a nonlinear load.

FIG. 5 illustrates the voltage and current drawn by a nonlinear load 8, such as PC computer. The current is drawn by the load 8 in spikes as shown. This essentially shows the current drawn by a switch-mode power supply.

Figure 6:
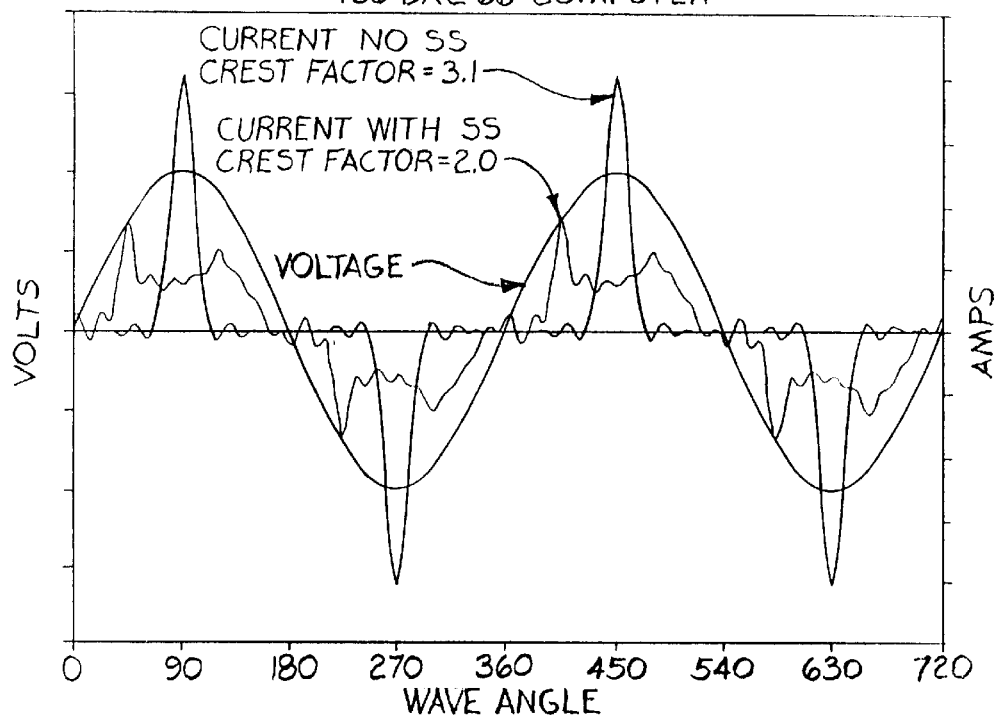
FIG. 6 is a graph showing a typical current drawn by a nonlinear load with and without the Blockade™ Technology harmonic suppression system according to the invention.

FIG. 6 illustrates current with and without the suppression system 10 connected is series with the load 8. The crest factor (the ratio of peak current to RMS current) is reduced from 3.1:1 to 2.0:1, thus lowering peak load in the electrical distribution system. Thus reduction in peak current draw increases the number of loads which can be connected in the electrical power system.

Figures 7, 8:
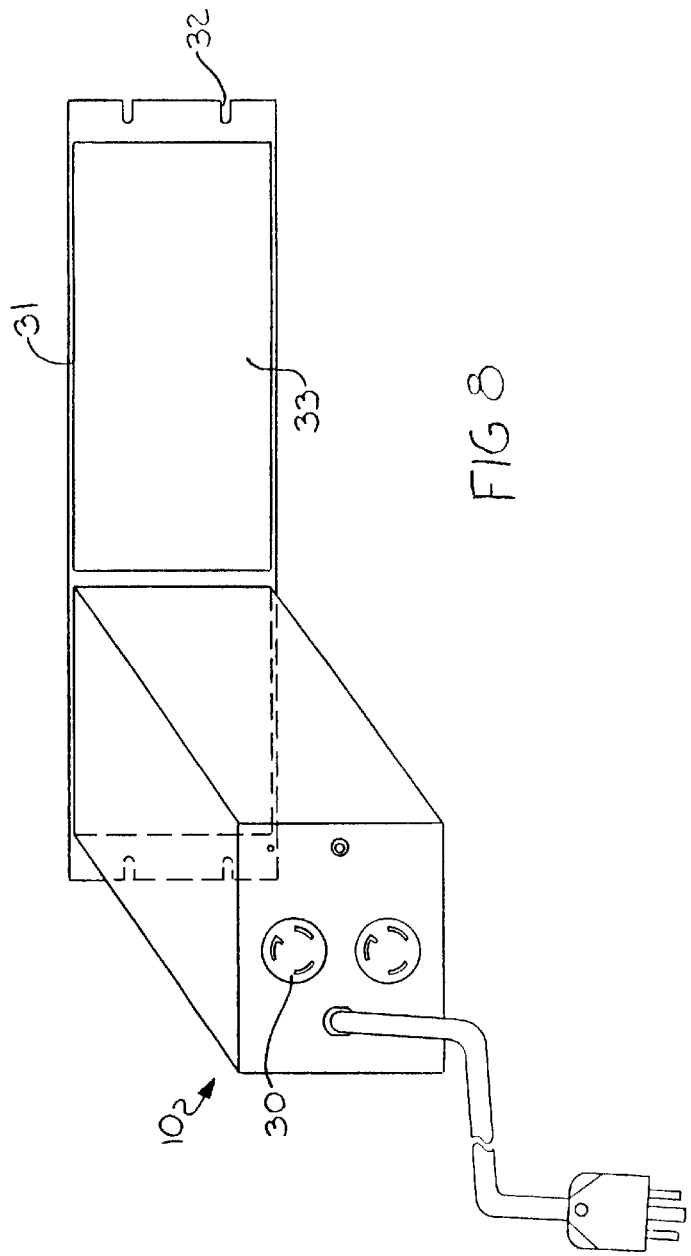
FIG. 7 is a chart of the electrical values with and without the Blockade™ Technology harmonic suppression system.
FIG. 8 is a perspective view of an embodiment of the invention configured to mount to an equipment rack.

FIG. 7 shows the results in a 3-phase wye-connected system with and without the use of the Blockade™ Technology harmonic suppression system according to the invention. With the use of the Blockade™ Technology harmonic suppression system: the RMS current in each phase decreases; the power is substantially the same, indicating that each computer or other nonlinear load functions properly; and the volt-amps decreases and the power factor increases, indicating the release of unuseable system capacity, such as more computers with the same power system.

FIG. 8 shows an embodiment of the invention designed for installation in an electronics equipment rack. The embodiment includes: jacks 31 for connection to the nonlinear loads 8; and a rack panel 31 which is provided with rack connecting slots 32 and a substantially perforated portion to allow airflow therethrough. In this way, the device can replace a cooling panel to improve system performance without sacrificing airflow or extra rack space.

Figure 2:
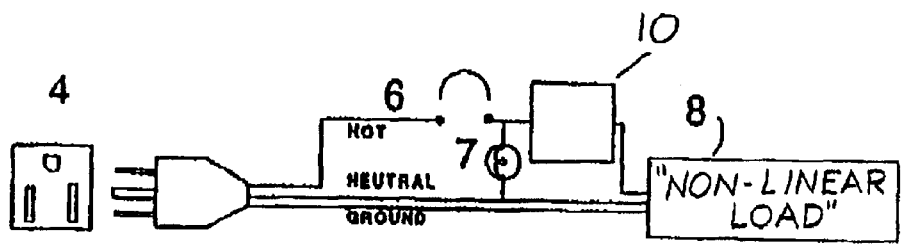
FIG. 2 is a block diagram of an embodiment of the invention connected with an electrical power system.
Figure 3:
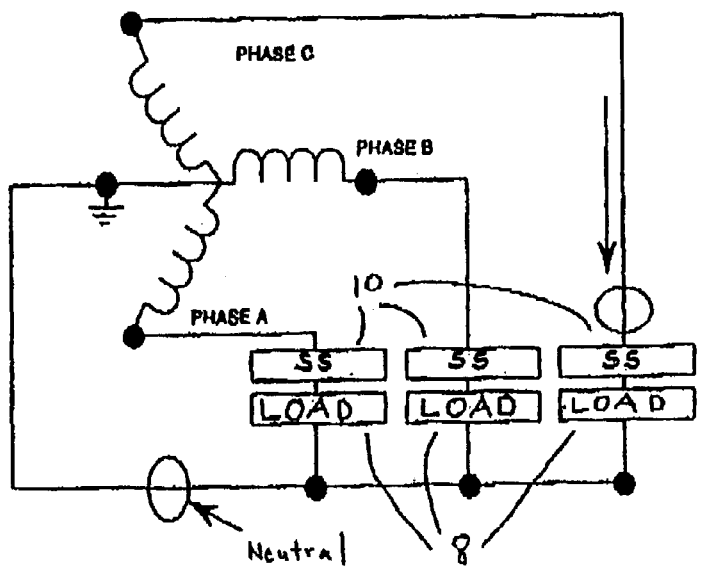
FIG. 3 is a schematic block diagram showing an embodiment of the invention connected in a 3-phase wye-connected electrical power system.
Figure 9:
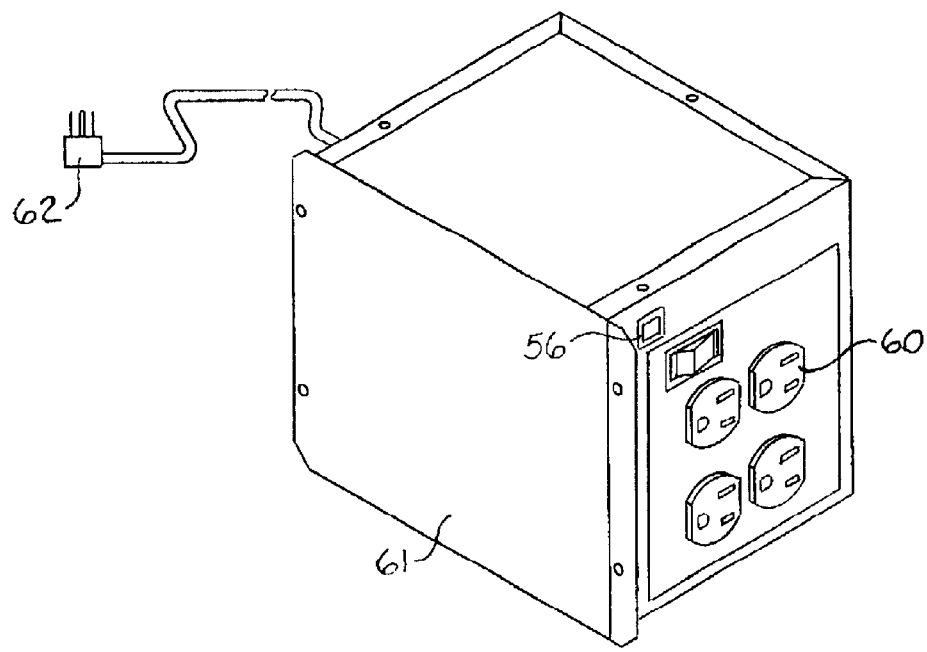
FIG. 9 is perspective view of another embodiment of the invention.

The embodiment shown in FIGS. 2 and 3 may be added to an electrical distribution system by connecting the harmonic suppression system 10 with a plug between the AC source 4, such as a wall outlet, and the nonlinear load 8. Optionally, there may be included a circuit breaker 6 (FIG. 2) to protect the circuitry from excessive current. Also, optionally, there may be included a pilot light 7 (FIG. 2) or 56 (FIG. 9) which provides an indication that the circuit is powered and functional.

In use, the harmonic suppression device 61 (FIG. 9) according to the invention may be installed into a power system by connecting the device 61 to an AC source by plugging power cord 62 into an AC outlet and plugging the nonlinear loads 8 into sockets 60 of device 61.

FIG. 10 shows an embodiment indicating the harmonic current flow with computer or other nonlinear loads 8 without the Blockade™ Technology harmonic suppression system 10. Note the circulating $3^{rd}$ harmonic currents, and the current which is the sum of the $3^{rd}$ harmonics from all three phases plus the imbalance current.

FIG. 11 shows an embodiment of the invention each computer load 8 is plugged into a series blocking suppression system 10. The neutral in the system is now required to carry only 60 Hz imbalance currents.

The only disadvantage to the FIG. 11 embodiment is that, with the hundreds of computers 8 existing in an office environment, numerous harmonic suppression systems 10 must be purchased, distributed and inventoried. Locating a single large harmonic suppression system 10 in the neutral of the electrical distribution system, as shown in the FIG. 12 embodiment, overcomes this disadvantage.

FIG. 12 illustrates the application of a series blocking harmonic suppression system 10 in the neutral of a 208/120 volt wye-distribution system 41 serving single-phase computer loads 8. When placed in this location, a single suppression system 10 serves the same purpose as multiple plug-in suppression systems 10. Because all current that flows in the phases must return through the neutral, the placement of a near-infinite 3rd harmonic impedance, viz., suppression system 10, in the neutral prevents 3rd harmonic currents from being drawn by the switch-mode power supplies 8.

Because the harmonic suppression system 10 has a low impedance at 60 Hz and the series inductive elements of the LRC harmonic suppression system 10 are UL tested to carry the full rated transformer current, operation of breakers under phase-neutral shorts is not affected by insertion of the harmonic suppression system 10. The neutral and safety ground 42 are tied together within the harmonic suppression system 10 and connected to building steel or a suitable grounding electrode 43 as required by the National Electrical Code. The only effect on the electrical distribution system is the complete elimination of system overheating and other problems caused by 3rd harmonic currents.

In FIGS. 11 and 12, the phase wires to each computer load 8 carry 60 Hz current and non-triplen harmonic current. The term "non-triplen harmonic current" is intended to mean harmonic current numbers which are not integrally divisible by 3, e.g., harmonics such as the $2^{nd}$, $4^{th}$, $5^{th}$, $7^{th}$, etc. The current flowing from each computer 8 to ground is the 60 Hz imbalance current only. No $3^{rd}$ harmonic currents circulate in the delta winding 40 of the transformer, transformer overheating is eliminated, and oversized neutrals are not needed.

Figure 13:
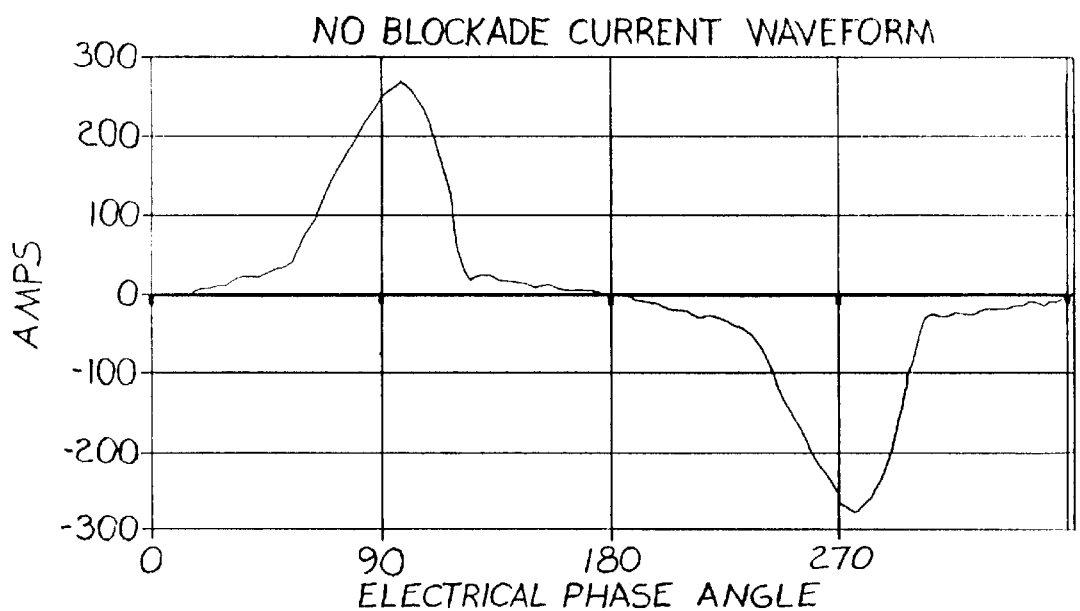
FIG. 13 is a graph showing the phase A current of FIG. 12 without the Blockade™ Technology harmonic suppression system.
Figure 14:
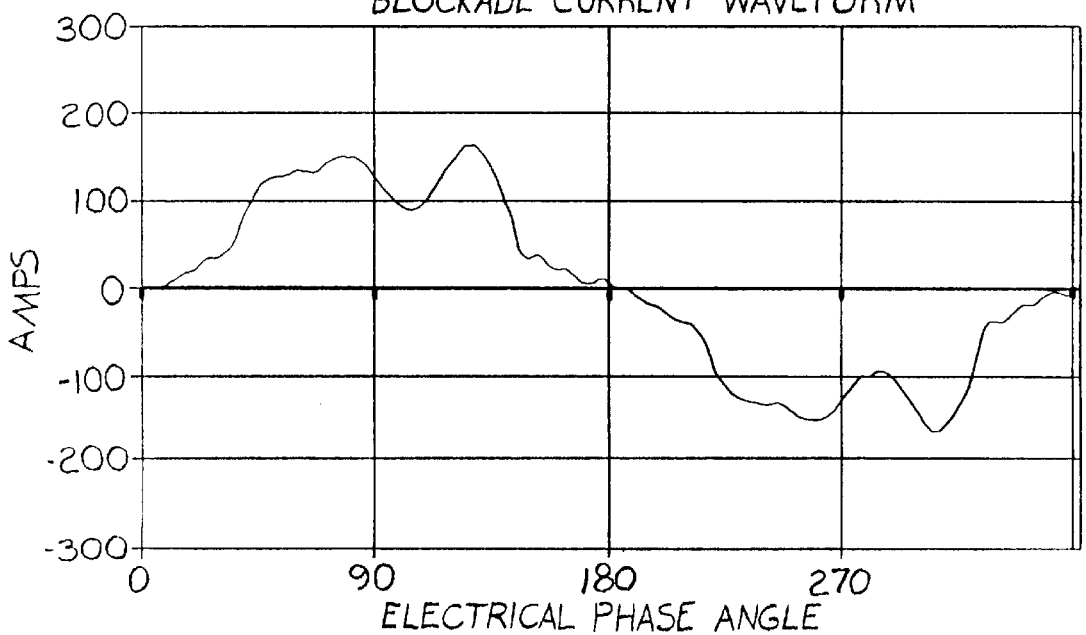
FIG. 14 is a graph showing the phase A current of FIG. 12 with the Blockade™ Technology harmonic suppression system.

FIGS. 13 and 14 show the phase current without and with the Blockade™ Technology, respectively, of the FIG. 12 embodiment. The Phase A current is typical of the three phases. In FIG. 13, note the high current peak indicative of single-phase computer loads. FIG. 14 shows, after the harmonic suppression system 10 is connected, the high current peak is reduced and the current waveform appears to be more sinusoidal.

Figure 15:
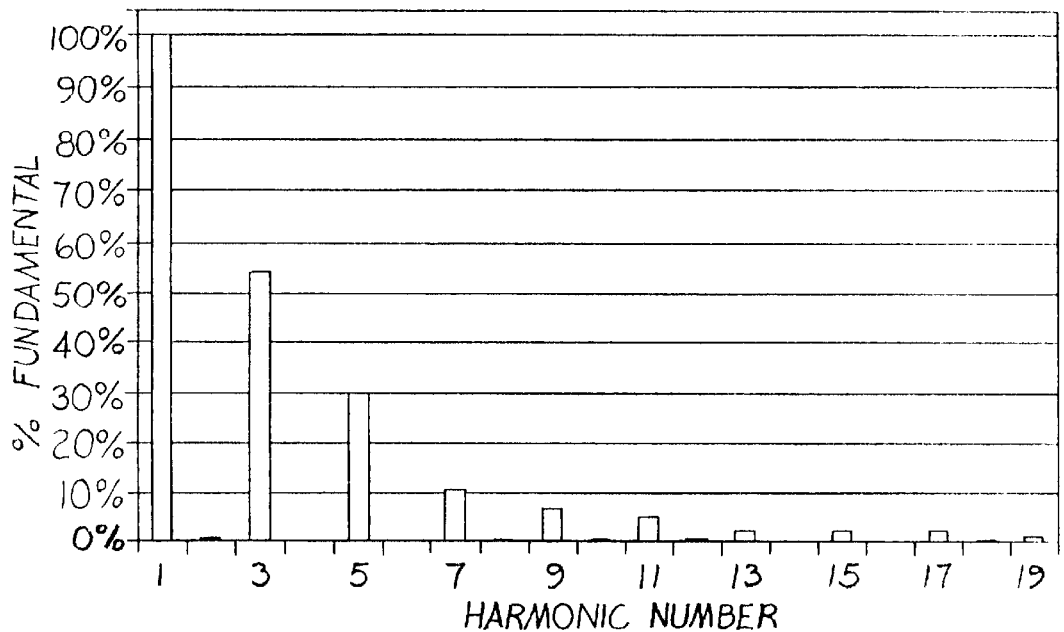
FIG. 15 is a graph of the harmonic current spectrum of a 3-phase system before application of a Blockade™ Technology harmonic suppression system.
Figure 16:
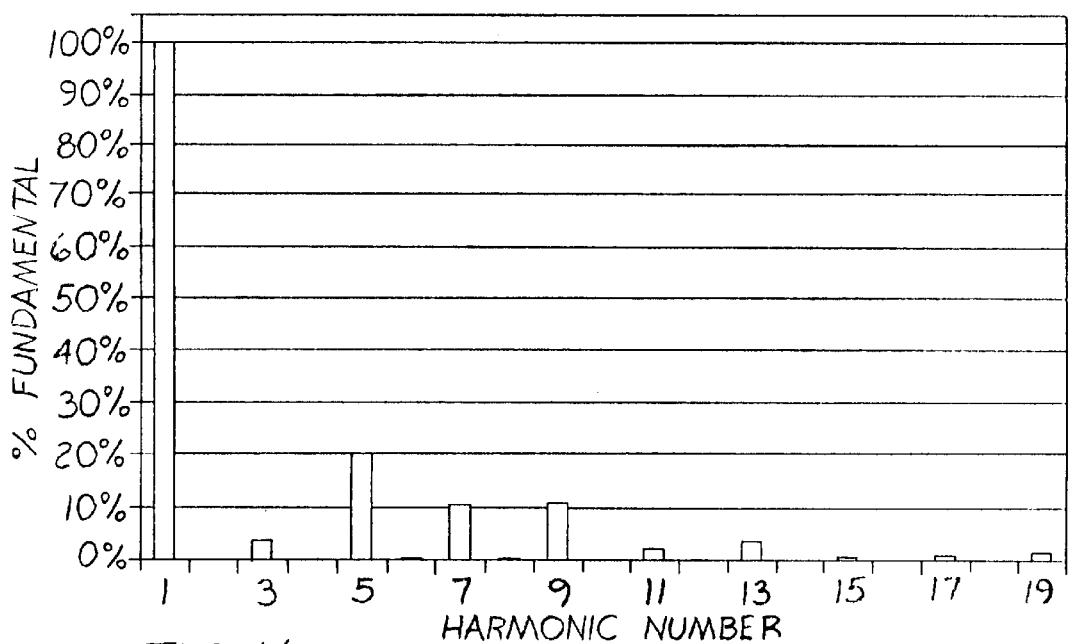
FIG. 16 is a graph of the harmonic current spectrum of a 3-phase system after application of a Blockade™ Technology harmonic suppression system.

FIGS. 15 and 16 show the phase harmonic spectrum without and with the Blockade™ Technology, respectively, of the FIG. 12 embodiment. FIG. 15 illustrates typical computer power supply spectrum showing a high $3^{rd}$ harmonic with other harmonics decreasing in a smooth curve. In FIG. 16 note that the $3^{rd}$ harmonic has been almost completely removed and the other harmonics are reduced.

Figure 17:
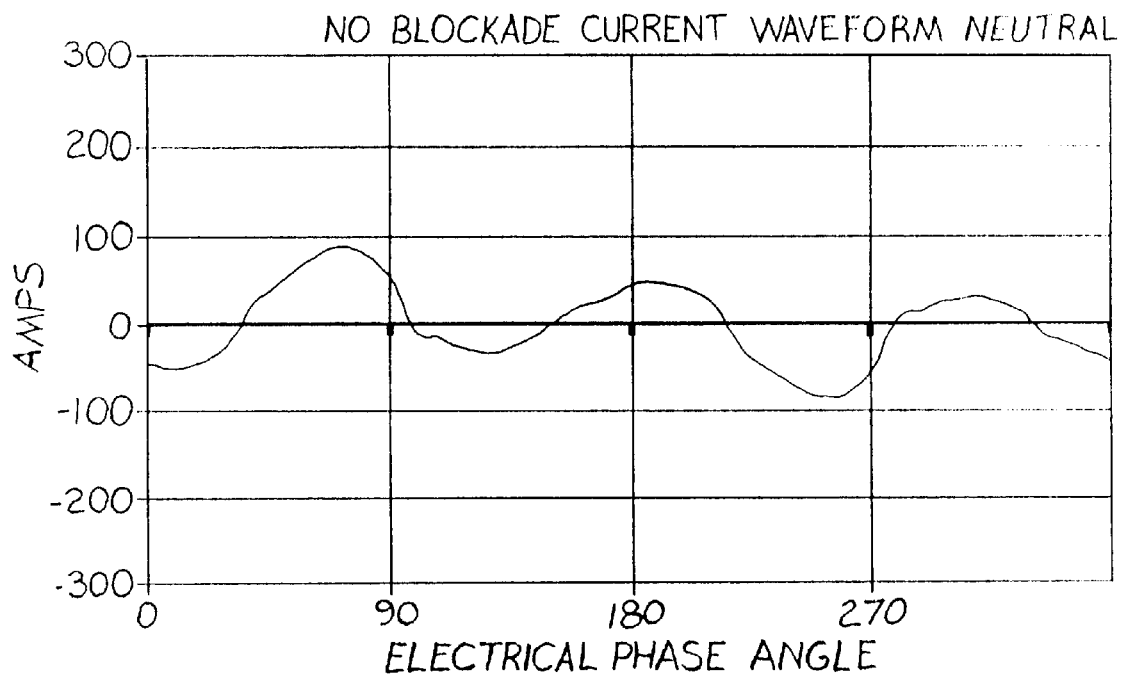
FIG. 17 is a graph showing the neutral current of FIG. 12 without the Blockade™ Technology harmonic suppression system.
Figure 18:
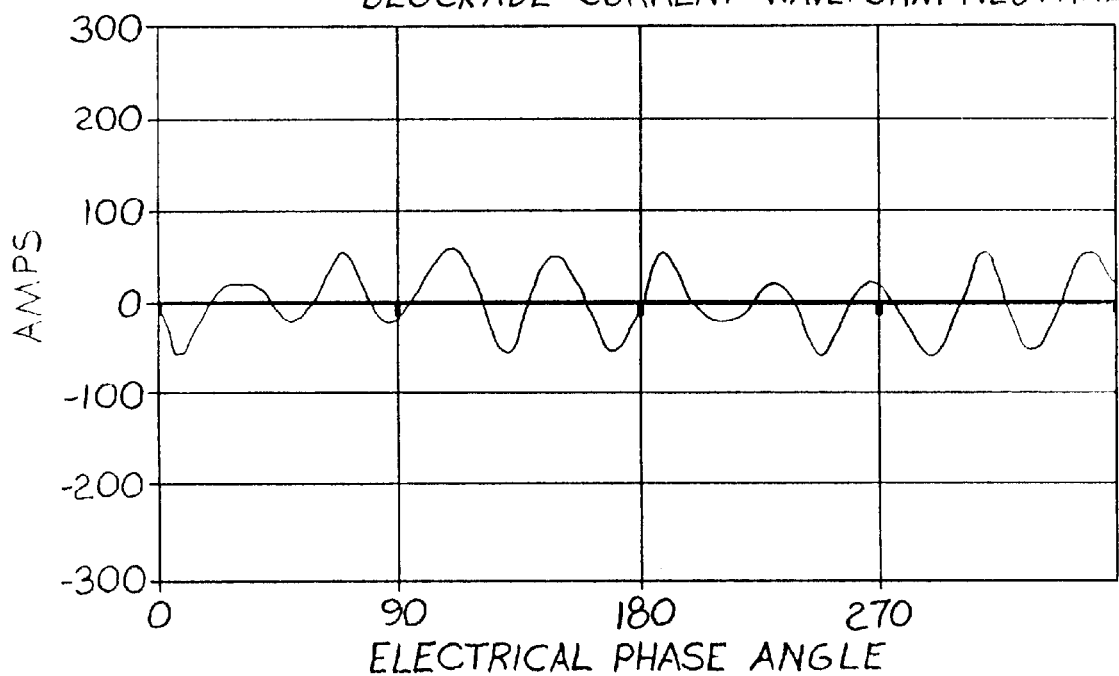
FIG. 18 is a graph showing the neutral current of FIG. 12 with the Blockade™ Technology harmonic suppression system.

FIGS. 17 and 18 show the neutral current without and with the Blockade™ Technology, respectively, of the FIG. 12 embodiment. The current waveform in FIG. 17 is typical of neutrals serving single-phase computer loads. The current is predominantly 180 Hz. In contrast, in FIG. 18 the amplitude of the neutral current is reduced, and the 180 Hz is no longer present.

FIGS. 19 and 20 show the neutral harmonic spectrum without and with the Blockade™ Technology, respectively, of the FIG. 12 embodiment. For a neutral current of 160 amps RMS, FIG. 15 shows that the $3^{rd}$ harmonic is 149 amps, and 50 amps of 60 Hz imbalance current is flowing. In contrast, FIG. 20 shows that: the RMS current is only 36 amps; the loads 8 were balanced so the 60 Hz current is only 9 amps; and the 3$^{rd}$ harmonic current is only 5 amps (a reduction of 97%).

Figure 21:
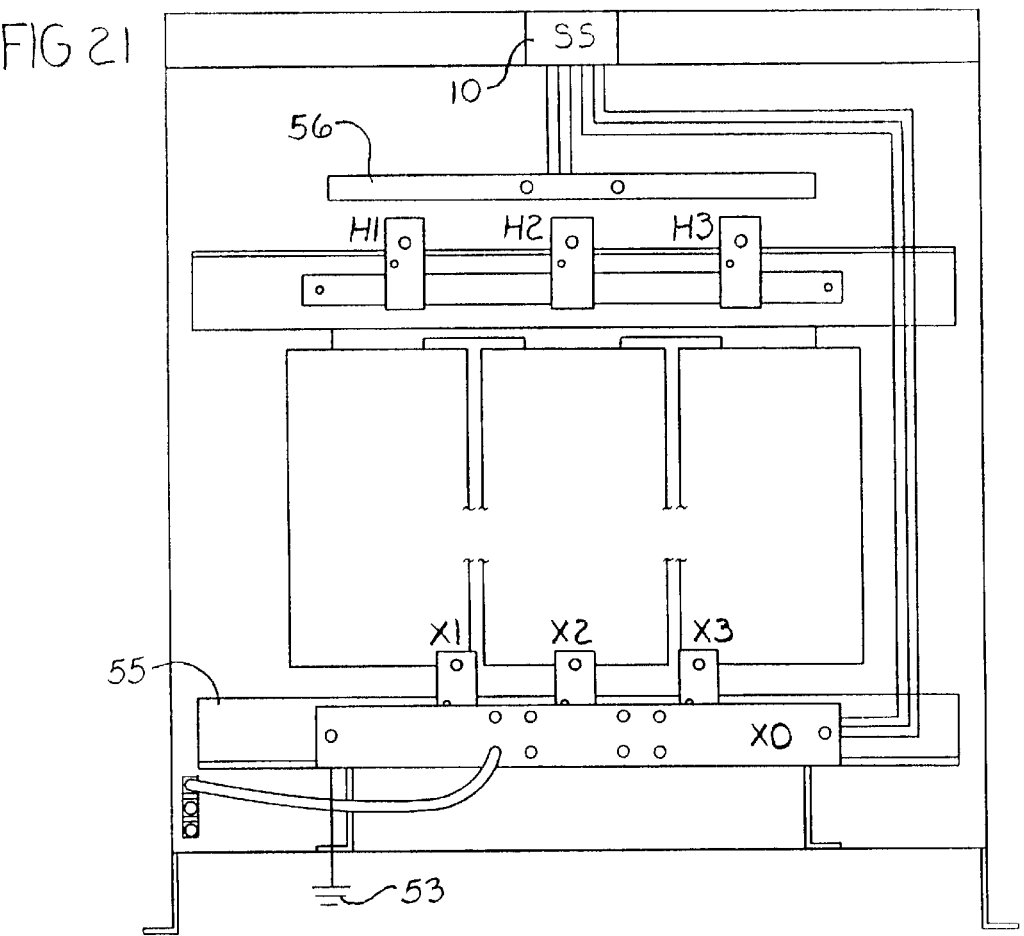
FIG. 21 shows the connection details for the combined transformer and a Blockade™ Technology harmonic suppression system illustrated in FIG. 22.
Figure 22:
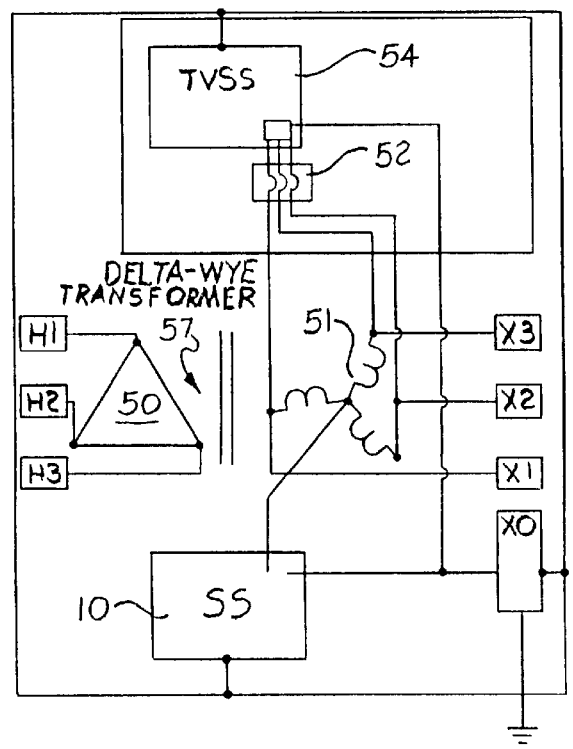
FIG. 22 shows a combined transformer and a Blockade™ Technology harmonic suppression system.

FIG. 22 shows a combined delta-wye transformer 57, a Blockade™ Technology harmonic suppression system 10, and a transient voltage surge suppressor (TVSS) 54. The TVSS 54 is also known as a spike suppressor. FIG. 21 shows connection details for the FIG. 22 embodiment. FIG. 21 shows the specialized customer connection busbars 55 and 56 which facilitate wiring and make field connections more obvious and intuitive. The suppression system 10 is pre-wired on top with the TVSS 54. The system is provided with circuit breakers 52, and a ground connection 53 to building steel. One advantage of the FIG. 21 and 22 embodiment is that it is pre-wired, and the user connects as if it were a simple transformer with no extra installation and no extra footprint space.

The harmonic suppression system 10 consists of a completely-passive LRC network, tuned to have an almost infinite impedance at the 3rd harmonic while the 60 HZ impedance is low. When placed in series with a switching power supply load, the harmonic suppression system 10 prevents the supply from drawing 3rd harmonic current.

The harmonic suppression system 10 has no measurable effect on operation of the computer power supply. However, the effect on the power distribution system is significant. Because the 3rd harmonic is never formed, there is nothing to remove or dissipate as heat. The effect of the harmonic suppression system 10 is bidirectional. Any current drawn through the harmonic suppression system 10 is free of 3rd harmonic. Therefore the system is free of this harmonic both toward the loads and back to the transformer. The 3rd harmonic currents simply do not exist anywhere in the distribution system.

The foregoing embodiments of the invention are merely examples of the invention, the scope of which is set forth in the accompanying claims.

What is claimed is:

1. In a multiple phase electrical distribution system for supplying power from an AC source to one or more non-linear loads connected to at least one phase line therein, a device for substantially eliminating currents in a neutral wire, said device comprising:
   a completely-passive parallel resonant circuit having three passive electrical branches connected in parallel;
   said first completely-passive parallel resonant circuit having an almost infinite impendence at a third harmonic frequency of a fundamental frequency of said AC source to prevent the formation of only said third harmonic frequency and no other frequency so that there is no third harmonic frequency to remove or dissipate as heat;
   said three passive electrical branches comprise a first branch consisting of a capacitor, a second branch consisting of a reactor, and a third branch consisting of a resistor; and
   said completely-passive parallel resonant circuit being electrically connected to said neutral wire, whereby said device is bi-directional in that said system is free of said third harmonic frequency both toward said nonlinear loads and back to said AC source.

2. The system according to claim 1, wherein:
   said completely-passive parallel resonant circuit is between said neutral wire and ground.

3. The system according to claim 2, wherein:
   said completely-passive parallel resonant circuit is directly connected to said neutral wire.

4. The system according to claim 2, wherein:
   each phase line of said multiple phase electrical system supplies power to an associated one of said nonlinear loads.

5. The system according to claim 3, wherein:
   each phase line of said multiple phase electrical system supplies power to an associated one of said nonlinear loads.

6. The system according to claim 1, wherein:
   said completely-passive parallel resonant circuit is directly connected to said neutral wire.

7. The system according to claim 6, wherein:
   each phase line of said multiple phase electrical system supplies power to an associated one of said nonlinear loads.

8. The system according to claim 1, wherein:
   each phase line of said multiple phase electrical system supplies power to an associated one of said nonlinear loads.

9. An electrical system for supplying power to one or more nonlinear loads connected to at least one phase line of a multiple phase distribution system, comprising:
   a delta-wye transformer;
   a completely-passive parallel resonant circuit having three passive electrical branches connected in parallel;
   said first completely-passive parallel resonant circuit having an almost infinite impedance at a third harmonic frequency of a fundamental frequency of said AC source to prevent the formation of only said third harmonic frequency and no other frequency so that there is no third harmonic frequency to remove or dissipate as heat;
   said three passive electrical branches comprise a first branch consisting of a capacitor, a second branch consisting of a reactor, and a third branch consisting of a resistor; and said completely-passive parallel resonant circuit being electrically connected to the neutral wire of the wye-portion of said delta-wye transformers whereby said electrical system is bi-directional in that said system is free of said third harmonic frequency both toward said nonlinear loads and back to said delta-wye transformer.

10. The system according to claim 9, including:
    a transient voltage surge suppressor connected to said wye-portion of said delta-wye transformer.

11. The system of claim 10, wherein:
    said nonlinear loads are connected to each phase of said wye-portion of said delta-wye transformer.

12. The system according to claim 11, wherein:
    each phase line of said multiple phase electrical distribution system supplies power to an associated one of said nonlinear loads.

13. The system according to claim 10, wherein:
    said completely-passive parallel resonant circuit is directly connected to said neutral wire.

14. The system according to claim 10, wherein:
    each phase line of said multiple phase electrical distribution system supplies power to an associated one of said nonlinear loads.

15. The system of claim 9, wherein:
    said nonlinear loads are connected to each phase of said wye-portion of said delta-wye transformer.

16. The system according to claim 15, wherein:

each phase line of said multiple phase electrical distribution system supplies power to an associated one of said nonlinear loads.

17. The system according to claim 9, wherein:

said completely-passive parallel resonant circuit is between said neutral wire and ground.

18. The system according to claim 17, wherein:

each phase line of said multiple phase electrical distribution system supplies power to an associated one of said nonlinear loads.

19. The system according to claim 9, wherein:

said completely-passive parallel resonant circuit is directly connected to said neutral wire.

20. The system according to claim 9, wherein:

each phase line of said multiple phase electrical distribution system supplies power to an associated one of said nonlinear loads.

* * * * *